US007764677B2

(12) United States Patent
Koehler, Jr. et al.

(10) Patent No.: US 7,764,677 B2
(45) Date of Patent: Jul. 27, 2010

(54) METHOD AND SYSTEM FOR POLICY-BASED ADDRESS ALLOCATION FOR SECURE UNIQUE LOCAL NETWORKS

(75) Inventors: Edwin Koehler, Jr., Ontario, NY (US); Sergio Fiszman, Nepean (CA); Cherif Sleiman, East Amherst, NY (US)

(73) Assignee: Nortel Networks Limited, St. Laurent, Quebec (CA)

( * ) Notice: Subject to any disclaimer, the term of this patent is extended or adjusted under 35 U.S.C. 154(b) by 769 days.

(21) Appl. No.: 11/524,215

(22) Filed: Sep. 20, 2006

(65) Prior Publication Data

US 2008/0069102 A1    Mar. 20, 2008

(51) Int. Cl.
   *H04L 12/28* (2006.01)
(52) U.S. Cl. .................................... 370/389; 726/26
(58) Field of Classification Search ................. None
   See application file for complete search history.

(56) References Cited

U.S. PATENT DOCUMENTS

| | | | | |
|---|---|---|---|---|
| 7,463,637 | B2* | 12/2008 | Bou-Diab et al. | 370/401 |
| 2003/0217148 | A1* | 11/2003 | Mullen et al. | 709/225 |
| 2005/0246771 | A1* | 11/2005 | Hunt et al. | 726/18 |
| 2007/0101159 | A1* | 5/2007 | Zhang et al. | 713/193 |
| 2007/0150552 | A1* | 6/2007 | Harris et al. | 709/218 |
| 2007/0230457 | A1* | 10/2007 | Kodera et al. | 370/389 |
| 2008/0021997 | A1* | 1/2008 | Hinton | 709/225 |
| 2008/0196098 | A1* | 8/2008 | Cottrell et al. | 726/12 |

* cited by examiner

*Primary Examiner*—Phirin Sam
(74) *Attorney, Agent, or Firm*—Christopher & Weisberg, P.A.

(57) ABSTRACT

The present invention advantageously provides a method, system and apparatus for allocating addresses to secure unique local networks by providing a brokered federated policy and identity management system, the brokered federated policy and identity management system having an address domain manager that allocates network addresses, the address domain manager arranged to interoperate with a network identity management module, the network identity management module providing management of identity at an application level, receiving an authorization from the brokered federated policy and identity management system, and assigning a network address to a unique local network based on the authorization from the brokered federated policy and identity management system. The method, system and apparatus may further include authenticating a user, wherein authenticating a user includes passing an assertion token to a device of the user. The method, system and apparatus may yet further include providing user policies to a policy enforcement point in a network.

19 Claims, 4 Drawing Sheets

METHOD AND SYSTEM FOR POLICY-BASED ADDRESS ALLOCATION FOR SECURE UNIQUE LOCAL NETWORKS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks, and more particularly to a method, system and apparatus that provides for policy-based address allocation.

BACKGROUND OF THE INVENTION

Users of services and resources from enterprise and service providers often have multiple public and private identifiers. People may have identities associated with different roles, e.g., at work, at home, and associated with hobbies, sports, and community activities. Users may roam, and are increasingly mobile. With the current diversity of available communication options, an individual user may have multiple communication devices, desktop personal computers ("PC"), personal data assistance ("PDA"), mobile phone, or other devices for using different applications, voice telephony, instant messaging, email web applications, enterprise resource planning ("ERP"), video, collaboration/conferencing and the like.

Users therefore typically have needed to sign-on and be authenticated for different applications, and for different types of communication platforms. Single-sign-on ("SSO") may be available for some groups of applications, but often users may need to sign on separately for different communications. When users change networks, they will usually be required to sign-on and re-authenticate, particularly when changing between public and private networks. Although network security in general has seen increased priority in view of Sarbanes Oxley ("SOX") laws, Health Information Portability and Accountability Act ("HIPAA"), and other regulatory and business security compliance requirements for protection of confidential information, the protection of critical data on private networks remains a most vital concern.

The confidentially, integrity and privacy of critical data on private networks is subject to a variety of attacks including snooping, identity spoofing and data alteration. Many attackers attempt to gain access to a private network by attacking an employee's notebook computer, other computers on an employee's home network, the public internet, a wireless local area network ("WLAN") or the like. Each and every time an employee remotely accesses a company's private network, the security of critical data on a private network is in peril, however, numerous new networking features are provided as part of Internet Protocol version 6 ("IPv6"), including the use of IPv6 unique local addressing, which is globally unique and locally routable for use within a private organization as defined by request for comments ("RFC") 4193. Moreover, the IPv6 base standards also call for the use of multi-netting (the presence of multiple IPv6 network addresses) at the host level. The combination of these two features provide for a very dynamic concurrency in logical network presence. Although this combination offers an immense amount of flexibility there is great deal of concern regarding aspects of manageability and security. In particular, these features potentially provide numerous additional paths for an attacker to use in her attempts to access, intercept or destroy critical data on private networks.

What is desired is an arrangement under which the unique local addressing feature and the multi-netting feature can be managed to provide the ability to allocate addresses to the unique local addressing space in a secure manner.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention advantageously provides a method, system and apparatus for allocating addresses to secure unique local networks by providing a brokered federated policy and identity management system, the brokered federated policy and identity management system having an address domain manager that allocates network addresses, the address domain manager arranged to interoperate with a network identity management module, the network identity management module providing management of identity at an application level, receiving an authorization from the brokered federated policy and identity management system, and assigning a network address to a unique local network based on the authorization from the brokered federated policy and identity management system.

In accordance with one aspect, the present invention provides a method for allocating addresses to secure unique local networks. The method for allocating addresses to secure unique local networks includes allocating addresses to secure unique local networks by providing a brokered federated policy and identity management system, the brokered federated policy and identity management system having an address domain manager that allocates network addresses, the address domain manager arranged to interoperate with a network identity management module, the network identity management module providing management of identity at an application level, receiving an authorization from the brokered federated policy and identity management system, and assigning a network address to a unique local network based on the authorization from the brokered federated policy and identity management system. The method may further include authenticating a user, wherein authenticating a user includes passing an assertion token to a device of the user. The method may yet further include pushing down user policies to a policy enforcement point in a network.

In accordance with another aspect, the present invention provides a system for allocating addresses to secure unique local networks. The system for allocating addresses to secure unique local networks includes a brokered federated policy and identity management system, the brokered federated policy and identity management system having an address domain manager that allocates network addresses, the address domain manager arranged to interoperate with a network identity management module, the network identity management module providing management of identity at an application level. The system may further include a policy decision function, an authentication broker, a secure network access broker, and a threat protection system wherein the threat protection system oversees and monitors the first SULN for anomalies.

In accordance with yet another aspect, the present invention provides a method for allocating addresses to secure unique local networks. The method for allocating addresses to secure unique local networks by receiving notification of an attempt by a user to access a private network, assigning the user a first virtual local area network (VLAN), assigning the user a first virtual local area network (VLAN), authenticating the user, passing an assertion token to a device of the authenticated user, assigning a common default address to the device of the user, receiving a request from the user to access a secured application, the secured application residing on a first secure unique local network (SULN), and assigning a network address to the first SULN authenticating the user.

The method may further include verifying an assertion token from the user and placing the user into a second virtual local area network (VLAN). The method may further include providing user policies to a policy enforcement point in a network and assigning the IP address of the first secure unique local network (SULN) to the device of the user.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
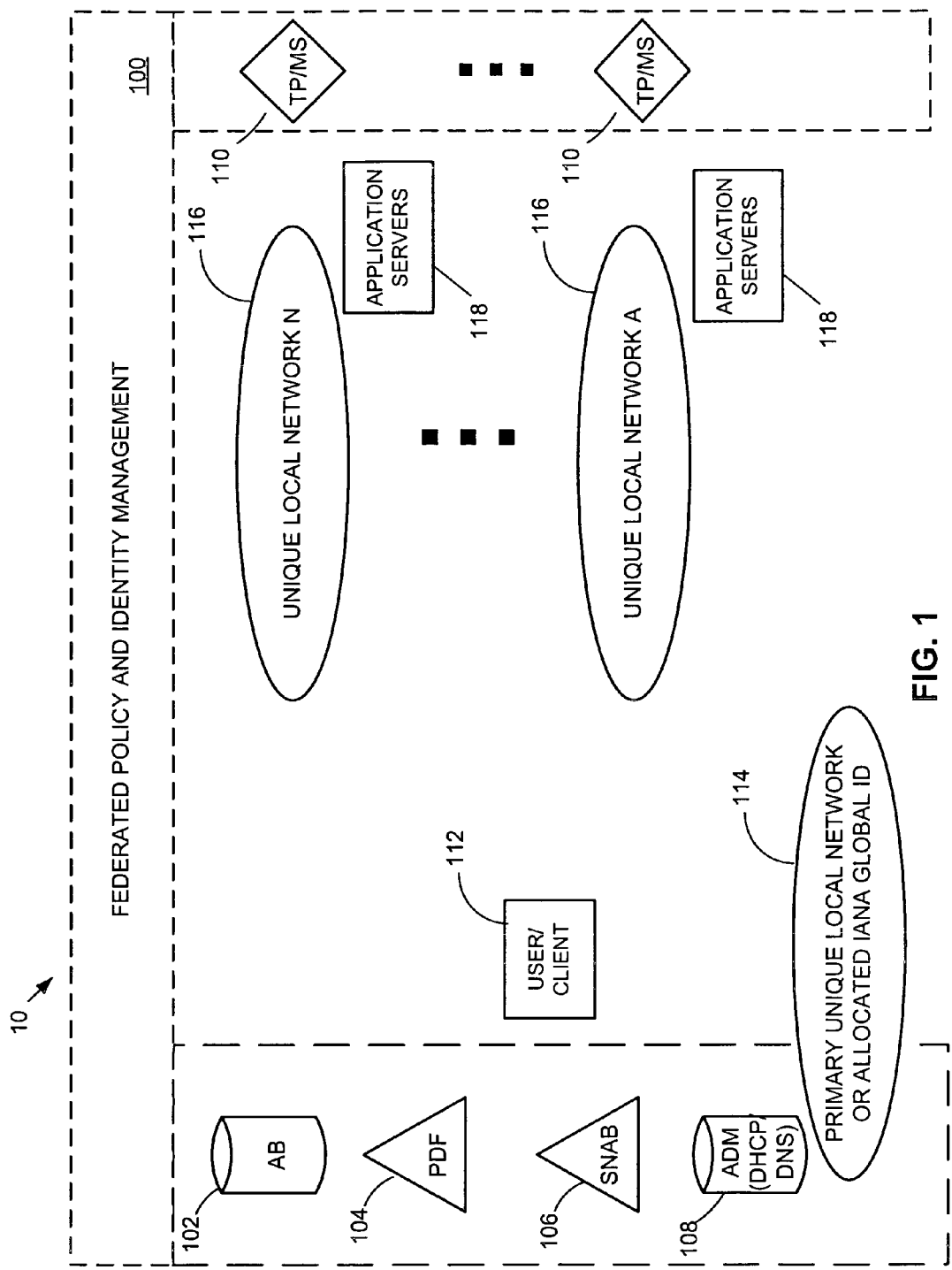
FIG. 1 is a block diagram of a network hosting an address allocation system of an embodiment of the present invention.

Referring to the drawing figures in which like reference designators refer to like elements, there is shown in FIG. 1 a block diagram of a network, designated as network 10 illustrating an address allocation system functionality in accordance with the principles of the present invention. FIG. 1 illustrates that the IPv6 address domain manager ("ADM (DHCP/DNS)") 108 has been merged into the federated policy and identity management system or framework ("IDM-FPF") 100. The ADM (DHCP/DNS) 108 provides or manages the domain name system ("DNS") and the dynamic host configuration protocol ("DHCP") to provide IP addressing for the network 10. When the ADM (DHCP/DNS) 108 is merged into the IDM-FPF 100, it provides a user-centric assignment of IPv6 unique local networks ("ULN") and also provides an organization with the ability to assign addresses with a very high granularity and assurance against a policy authority framework. In other words, the merger of the ADM (DHCP/DNS) 108 functionality into the IDM-FPF 100 provides a network with the capability to create secure unique local networks ("SULN") that are routed by the network routing elements as separate routed planes that have no network level connectivity and thus are separate or isolated from that network. Accordingly, the entities on a SULN will be limited to basically the routing elements interconnecting the address space and the hosts that have been assigned addresses to that space by the federated brokered policy system or framework. In this manner, the SULN provides a dedicated, secure and isolated network for an application server 118 and its active clients 112 and thus any data transmission on the SULN can be monitored such that any attacks or unauthorized access can quickly be identified and terminated as all activity on the SULN is readily attributable to given user 112. Except for the configured routing elements, the application server 118 is essentially the only other entity on the SULN. As the only way that other entities can gain access to the assigned address space is by IDM-FPF 100, the isolation and security of the SULN is very robust.

The IDM-FPF 100 also may comprise, but is not limited to, an authentication broker ("AB") 102, an policy decision function ("PDF") 104, a secure network access broker ("SNAB") 106, such as the Nortel secure network access ("NSNA") switch, and threat protection and monitor systems ("TP/MS") 110. In addition, the network 10 may further include a primary unique local network (or allocated Internet assigned numbers authority ("IANA") global identification ("ID")) 114, multiple unique local networks 116 (e.g., A through N) and application servers 118.

The AB 102 provides for the identification and authentication of a user who desires to use/access the network 10. The PDF 104 is a policy decision function that distributes policies to policy enforcement points ("PEP") 122 (shown in FIG. 2) that may be stored in switches, firewalls and the like. A PEP 122 is functionality available in switches and firewalls and is responsible for the enforcement of specific policies (e.g., quality of service ("QoS"), restrictions to access, etc.). The SNAB 106 is a virtual local area network ("VLAN") port-based access controller that can verify end-point (user device) compliance with specific rules, delegate user authentication and receive user authentication status and reverse proxy requests to applications.

Figure 2:
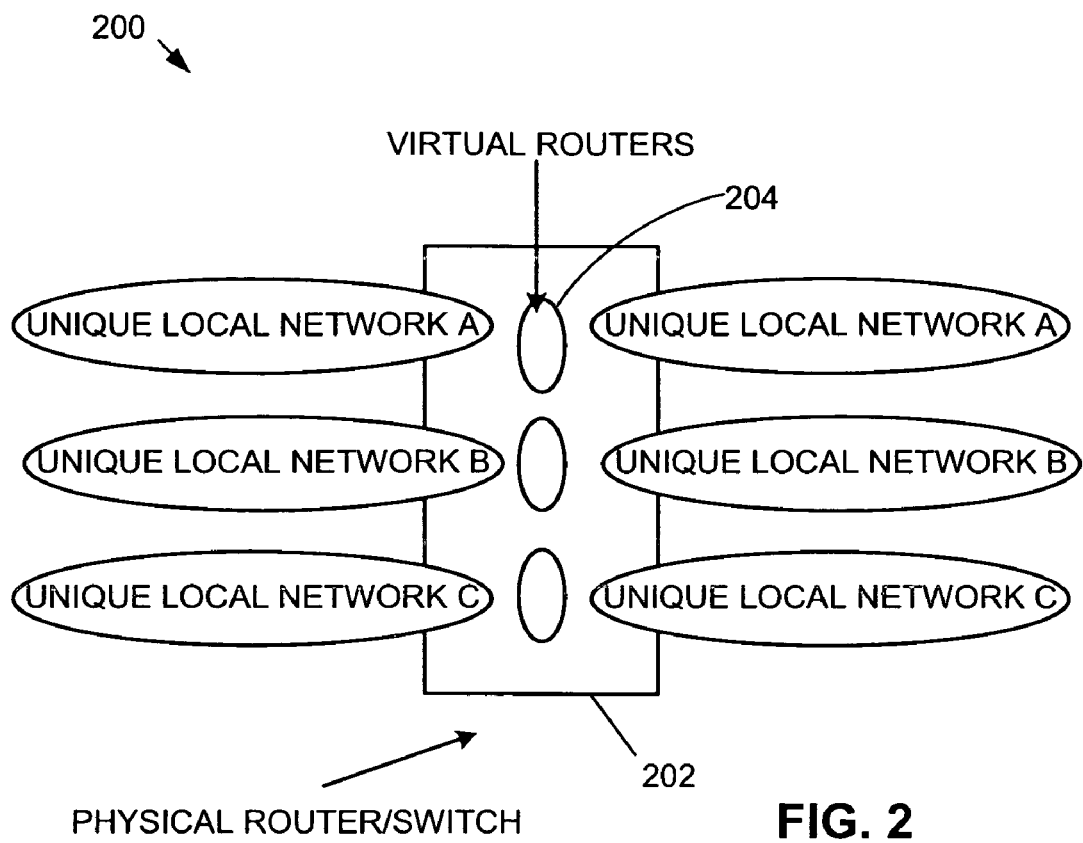
FIG. 2 is a block diagram of a virtual route forwarding function used in an embodiment of the present invention.

FIG. 2 illustrates the virtual route forwarding ("VRF") function 200 of the present invention. VRF 200 is based on the multi-netting feature of IPv6, and allows the creation of virtual planes or tiers for routing in the network. In this example, a single physical router/switch 202 is defined to have three virtual routers 204, which in turn allow the flow of addressing and data across unique local networks ("ULNs") (e.g., 1, 2 and 3). Without VRF 200, policy based address allocation is an effective means of managing the IPv6 address space based on human identity within an organization. With VRF 200, unique local networks can be separated and thereby secured. The combination of identity aware address allocation and VRF 200 yield the concept of 'secure' unique local networks ("SULN").

Figure 3:
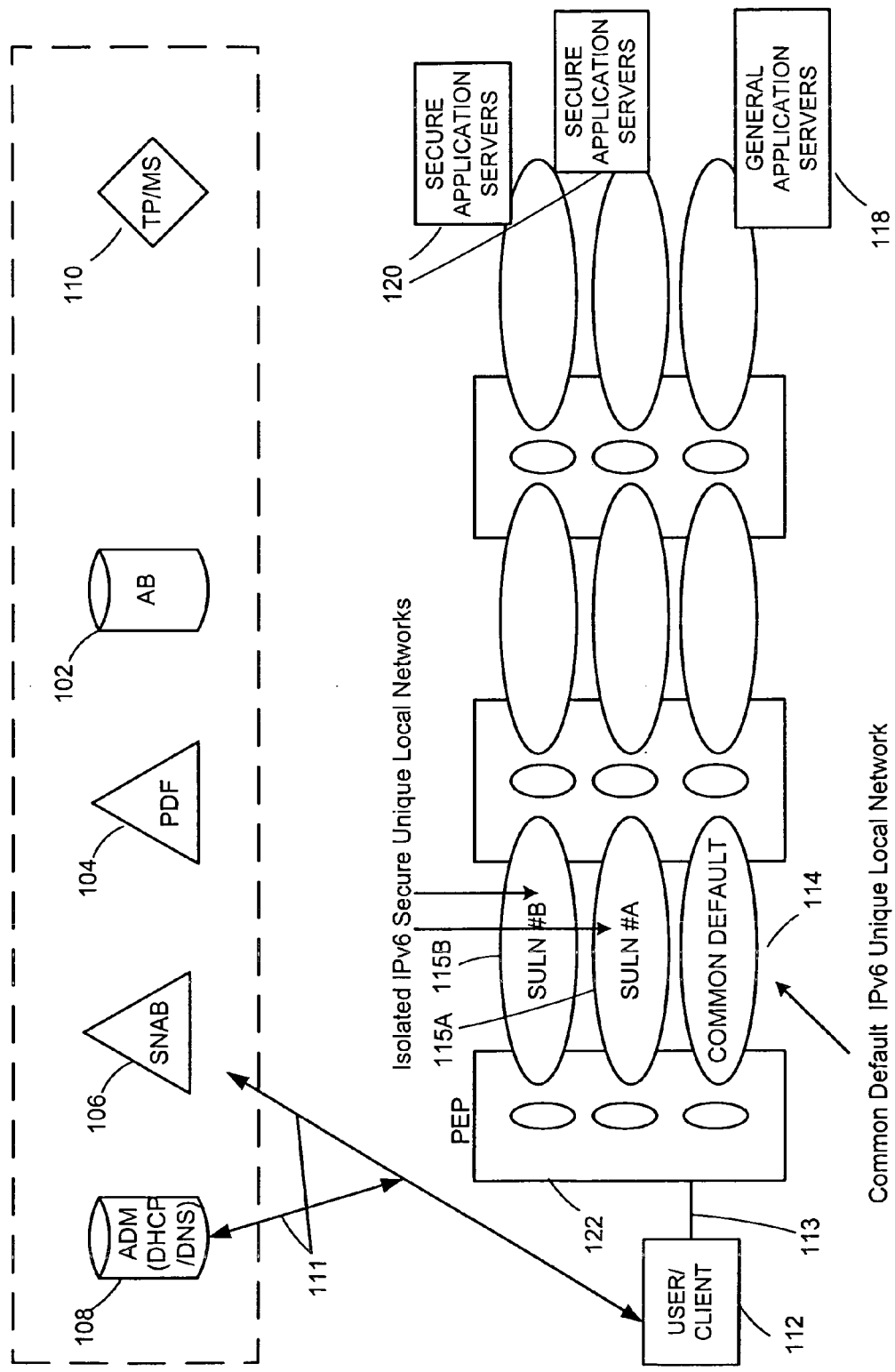
FIG. 3 is a block diagram of an address allocation system of an embodiment of the present invention.

FIG. 3 illustrates an embodiment of the invention wherein the VRF feature 200 is applied to ULN #A and ULN #B to create the isolated IPv6 secure unique local networks ("SULN") 115A and 115B. In this embodiment, the user/client 112 can plug a device into the network 10. As previously described with respect to FIG. 1, the network 10 comprises, but is not limited to, IDM-FPF 100, AB 102, PDF 104, SNAB 105, ADM (DHCP/DNS) 108 and TP/MS 110. In this embodiment, the network 10 further comprises a first VLAN 111, which provides limited access to SNAB 106 and ADM (DHCP/DNS) 108, a second VLAN 113, which is specific for that user/client's role, a common default ULN 114, and SULN #A 115A and SULN#B 11B, which provide access to general application servers 118 and secure application servers 120. A more detailed discussion of the operation of this embodiment of network 10 follows below with respect to FIG. 5.

Figure 4:
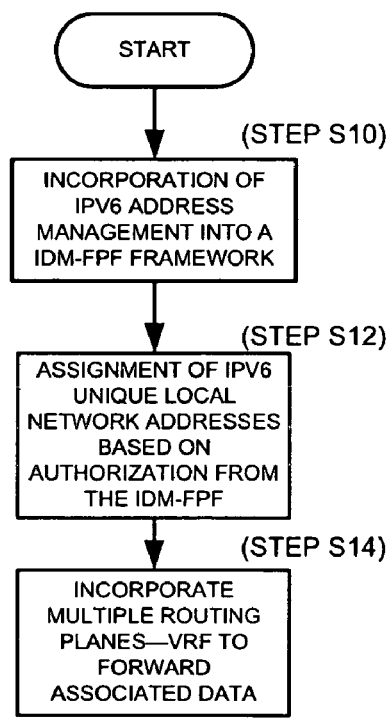
FIG. 4 is a flowchart of a process for address allocation in accordance with the principles of the present invention.

FIG. 4 illustrates a top-level methodology for the creation of the logical element referred to herein as a secure unique local network ("SULN") 115. The first step S10 is to incorporate the IPv6 address management (e.g., ADM (DHCP/DNS) 108) into the federated policy and identity management framework (e.g., IDM-FPF 100) to create an authorized gated method for IPv6 address allocation and the concept of a secure unique local network. The second step S12 provides for the assignment of IPv6 unique local network addresses based on authorization from the federated policy and identity management framework for access to a SULN 115. Step S14 provides for the incorporation of multiple routing planes (e.g., VRF feature 204) to forward data associated with the SULNs 115. Each routing plane has individual open shortest path first ("OPSF") protocol link weights and can thus route traffic independently of the other planes. For example, each plane may be used to route traffic of an equivalent QoS-class to meet performance constraints of that class. This allows for the concurrent usage of these IPv6 SULNs 115 to be routed by the IPv6 network routing elements as separate routed planes that have no network connectivity. Consequently, the only entities on a secure unique local network will be the routing elements interconnecting the address space and the hosts that have been assigned addresses to that space by the federated brokered policy framework. The secure unique local network can provide a dedicated and isolated network for an application server and only its active clients.

Figure 5:
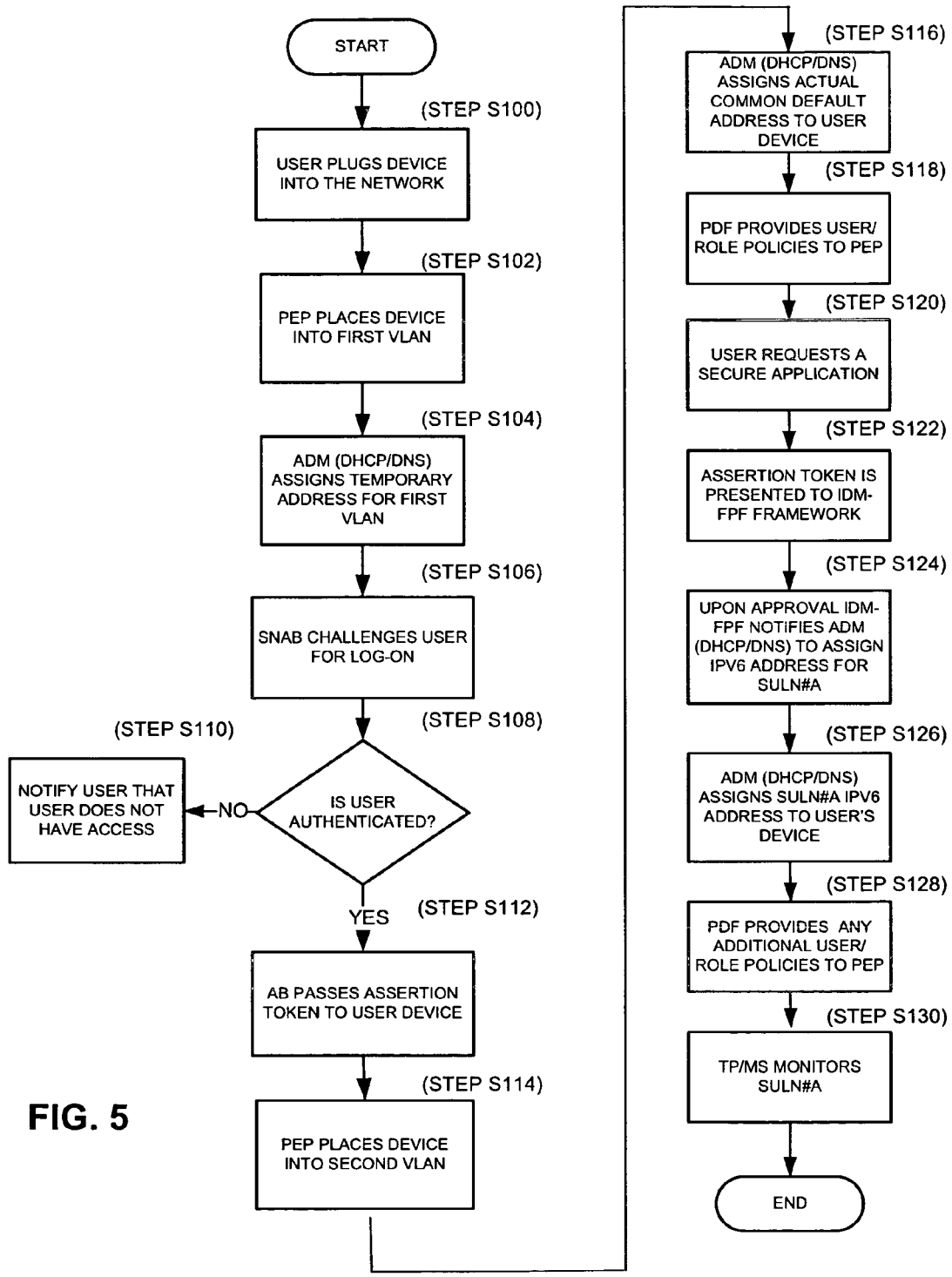
FIG. 5 is a more detailed flowchart of a process for address allocation in accordance with the principles of the present invention.

The operation of one embodiment of the policy based address allocation system of network 10 is illustrated by the flowchart of FIG. 5. At step S100, a user/client 112 can plug a device into the network 10 at which time the PEP 122 places the device into a first VLAN 111 (step S102), which will only allow access to the SNAB 106 and ADM (DHCP/DNS) 108. The ADM (DHCP/DNS) 108 assigns a temporary address for the first VLAN 111 (step S104), and SNAB 106 can challenge the user for a proper log-on (step S106). The user/client 112 can respond to the challenge and can be authenticated by AB 102 (step S108). If authenticated by AB 102, then AB 102 can pass an assertion token to the user device (step S112); otherwise the user is notified that they do not have access to the network (step S110). The SNAB 106 can then notify the PEP 122 to place the user into a second VLAN 113 that is specific for that user/client's 112 role (step S114). At step S116, the ADM (DHCP/DNS) 108 can then assign the actual common 'default' IPv6 address 114 to the user/client device. The PDF 104 can push down the user/role policies to the PEP 122 (step S118).

Next, at step S120, the user may request access to a secure application 120 (e.g., financial applications) and the assertion token is presented to the IDM-FPF framework 100 (step S122). Upon approval, the IDM-FPF framework 100 notifies the ADM (DHCP/DNS) 108 to assign an IPv6 address for the SULN#A (step S124), and the ADM (DHCP/DNS) 108 assigns the SULN#A's IPv6 address to the user's device (step S126). At step S128, the PDF 104 can push down any additional user/role policies to the PEP 122, while the TP/MS 110 oversees and monitors the SULN#A for any anomalies or attacks on the secure application server 120 (step S130). The types of anomalies or attacks can include for example, the situation where an end user mounts a DOS attack on a secure server 120, or an end user "spoofs" presence onto the IPv6 secure unique local network.

In general, the active clients are monitored for activity during the course of application interaction. Upon termination of the application session, the IDM-FPF 100 may notify the dynamic host configuration protocol in an IPv6 environment ("DHCPv6") server, which is part of ADM (DHCP/DNS) 108 that the assigned address is to be revoked from the end user. Depending on the level of security desired, a user/client 112 might be allocated an IPv6 unique local address for only the active session duration with the secure application server 120, which provides a more secure mode of operation. Otherwise, in a less secure mode, a client is allocated all assigned ULNs that correspond to a set of managed address pools for the SULN to which the user has been authorized by the IDM-FPF 100. In either mode, the IDM-FPF 100 (and its TP/MS 110) can cause the revocation of any unique local address based on noticed anomalies of data. Alternatively, the leases may be revoked as a result of an update in the supporting directory systems of the IDM-FPF 100.

Referring back to FIG. 3, in the event that a user mounts a DOS attack on a secure server 120, the TP/MS 110 will observe the anomaly and then notify the PDF 104 in the IDM-FPF 100. The PDF 104 can reference the AB 102 for the user identification data and then notify the ADM (DHCP/DNS) 108 to revoke all network addresses. The PDF 104 and/or SNAB 106 can shut down the port by placing it in a safety VLAN (e.g., SULN#B 115B). The ADM (DHCP/DNS) 108 then revokes the lease on the IPv6 addresses to shut the DOS attacking user down.

In the event that a user spoofs the IPv6 address and obtains access to a secure application, the TP/MS 110 will observe the anomaly (e.g., by comparing the IPv6 address and the token data (or lack thereof)) and then notify the PDF 104 in the IDM-FPF 100. The PDF 104 can reference the AB 102 for the user identification data if the token data exists, and then notify the ADM (DHCP/DNS) 108 to revoke all network addresses. The PDF 104 and/or SNAB 106 can shut down the port by placing it in a safety VLAN (e.g., SULN#B 115B). The ADM (DHCP/DNS) 108 then revokes the lease on the IPv6 addresses to shut the spoofing user down.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for allocating addresses to a unique local network, the method comprising:
    providing a brokered federated policy and identity management system, the brokered federated policy and identity management system having an address domain manager the address domain manager:
        placing a user device into a first virtual local area network (VLAN);
        authenticating a user;
        placing the user device into a second virtual local area network (VLAN) that is specific to a role of the authenticated user;
        the address domain manager arranged to interoperate with a network identity management module, the network identity management module providing management of identity at an application level;
    receiving an authorization from the brokered federated policy and identity management system; and
    upon receiving a request for a secure application,
    assigning a network address to a unique local network based at least upon on the authorization from the brokered federated policy and identity management system.

2. The method of claim 1, wherein authenticating a user includes passing an assertion token to a device of the user.

3. The method of claim 1, wherein assigning a network address to a unique local network includes providing one or more user policies to a policy enforcement point network device, the policy enforcement point device enforcing network policies.

4. The method of claim 1, wherein the address domain manager assigns a network address for a first secure unique local network.

5. The method of claim 4, wherein the address domain manager assigns the network address for the first secure unique local network to a device of a user.

6. The method of claim 5, further comprising the step of:
    monitoring the data on the first secure unique local network for anomalies.

7. A system for allocating addresses to unique local networks, the system comprising:
    a brokered federated policy and identity management system, the brokered federated policy and identity management system having an address domain manager, the address domain manager:
        placing a user device into a first virtual local area network (VLAN); and
        authenticating the user; and
        placing the user device into a second virtual local area network (VLAN) that is specific to a role of the authenticated user,
        the address domain manager arranged to interoperate with a network identity management module, the network identity management module providing management of identity at an application level.

8. The system of claim 7 wherein the brokered federated policy and identity management system includes a policy decision function.

9. The system of claim 7 wherein the brokered federated policy and identity management system includes an authentication broker.

10. The system of claim 7 wherein the brokered federated policy and identity management system includes a secure network access broker.

11. The system of claim 7 wherein the brokered federated policy and identity management system includes a threat protection system.

12. The system of claim 7 further comprising a policy enforcement point.

13. A method for allocating addresses to unique local networks, the method comprising:
    providing a computer system, the computer system,
        receiving notification of an attempt by a user to access a private network;
        assigning the user a first virtual local area network (VLAN);
        authenticating the user;
        passing an assertion token to a device of the authenticated user;
        placing the user device into a second virtual local area network (VLAN) that is specific to a role of the user;
        assigning a common default address to the device of the user;
        receiving a request from the user to access a secured application, the secured application residing on a first secure unique local network (SULN); and
        assigning a network address to the first SULN.

14. The method of claim 13, further comprising the step of: verifying an assertion token from the user.

15. The method of claim 13, further comprising the step of: placing the user into a second virtual local area network (VLAN).

16. The method of claim 13, further comprising the step of: providing one or more user policies to a policy enforcement point network device, the policy enforcement point device enforcing network policies.

17. The method of claim 13, further comprising the step of: assigning the network address of the first secure unique local network (SULN) to the device of the user.

18. The method of claim 17, further comprising the step of: providing additional user policies to a policy enforcement point device, the policy enforcement point device enforcing network policies.

19. The method of claim 17, further comprising the step of: monitoring the SULN with a threat protection system, the threat protection system overseeing and monitoring of the first SULN for anomalies.

* * * * *